3,711,373
PROCESS FOR PRODUCING L-GLUTAMIC ACID
Katsunobu Tanaka, Kazuo Kimura, and Masaki Yamamoto, Machida-shi, Japan, assignors to Kyowa Hakko Kogyo Co., Ltd., Tokyo, Japan
No Drawing. Filed Feb. 20, 1969, Ser. No. 801,163
Claims priority, application Japan, Mar. 9, 1968, 43/14,944
Int. Cl. C12b 1/00
U.S. Cl. 195—28 R                 6 Claims

ABSTRACT OF THE DISCLOSURE

A process for producing L-glutamic acid by fermentation inexpensively on an industrial scale which comprises culturing *Corynebacterium alkanum* ATCC 21194, *Brevibacterium paraffinolyticum* ATCC 21195 or *Brevibacterium butanicum* ATCC 21196 in an aqueous nutrient medium containing a hydrocarbon as the main source of carbon. The use of gaseous hydrocarbons such as ethane, propane and butane makes the process commercially attractive. The addition of a non-utilizable hydrocarbon, a surface active agent or an antibiotic to the medium accelerates the fermentation and helps to increase the yield of L-glutamic acid.

This invention relates to a process for producing L-glutamic acid. More particularly, it relates to a process for the production of L-glutamic acid by fermentation. Even more particularly, the invention relates to a process for producing L-glutamic acid by fermentation with novel strains which are capable of assimilating hydrocarbons, especially gaseous hydrocarbons.

The present inventors have previously examined processes for the production of L-glutamic acid by the use of inexpensive hydrocarbons as the starting material source of carbon and have already reported on results with bacteria having the capability of producing L-glutamic acid from n-paraffins. As the result of further investigations, the present inventors have succeeded in the discovery of new species of bacteria which are capable of producing L-glutamic acid in high yield from gaseous hydrocarbons as the main carbon source. Such a process is especially advantageous since L-glutamic acid is a very useful substance both in the biochemical and in the nutrition fields.

Accordingly, one of the objects of the present invention is to provide an improved process for the production of the useful amino acid L-glutamic acid which overcomes the disadvantages and deficiencies of the prior art methods.

Another object of the present invention is to provide a process for producing L-glutamic acid by fermentation which may be carried out in an efficacious and relatively simple manner.

A further object of the invention is to provide a process for producing L-glutamic acid by fermentation which may be carried out advantageously on an industrial scale at low cost from inexpensive materials to give a high yield of product.

A still further object of the invention is to provide L-glutamic acid.

These and other objects and advantages of the present invention will become apparent to those skilled in the art from a consideration of the following specification and claims.

Specifically, fermentation with the use of the novel species of microorganisms described in the present invention and with the use of gaseous hydrocarbons as the main carbon source has many advantages with respect to an industrial production of L-glutamic acid, for example, (1) the starting material used as the carbon source is abundant and inexpensive, (2) the storage and transport of the starting material and the supply thereof to a culture medium are easy to carry out, (3) the recovery of residual starting material is convenient, (4) the control of the concentration of carbon source during fermentation is easy, (5) the fermentation liquor after the completion of the fermentation is clear, (6) the separation and purification of the product from the residual material is relatively simple, etc., when compared with the conventional fermentations using saccharine materials or liquid hydrocarbons as the starting material. For these reasons, the method of the present invention, wherein L-glutamic acid is directly produced from gaseous hydrocarbons by fermentation using the present new species, is considered to be the most inexpensive L-glutamic acid-producing method which has ever been described.

The new microorganism strains used in the present invention have been designated as *Corynebacterium alkanum*, *Brevibacterium butanicum* and *Brevibacterium paraffinolyticum*. They are natural isolates taken from the soil and have the following bacteriological characteristics:

*Corynebacterium alkanum*

(A) Morphological properties—
   Shape of bacterium: Usually short rods, frequently incomplete fission cells, branched cells and snapping-type-fission cells are recognized.
   Size: $0.5 \times 2.5$—$5.0$ micron
   Motility: Non-motile
   Spore: Not formed
   Flagella: Not formed
   Gram-staining: Positive
   Acid-fast: Not acid-fast (B) Culturing properties—
   (1) Agar colonies, medium growth, circular, smooth, entire, convex, yellowish-gray, glistening, and opaque.
   (2) Agar slant, medium growth, filiform, glistening, yellowish-gray, no odor, butyrous; the culture medium is not changed.
   (3) Nutrient broth, the growth of the surface is faint, moderately clouding.
   (4) Gelatin stab culture, none or slightly at top. No gelatin liquefaction.

(C) Physiological properties—
   (1) Optimum temperature: 25°–30° C. (the growth at 35° C. is slight).
   (2) Optimum pH: 5.0–9.0 (no growth at pH 4.0)
   (3) Oxygen requirement: Aerobic
   (4) Litmus milk: Not changed or alkaline
   (5) Hydrogen sulfide: Produced
   (6) Indole: Not produced
   (7) Starch: Not decomposed
   (8) Nitrites produced from nitrates.
   (9) Catalase: Positive
   (10) Production of ammonium: Negative
   (11) Voges-Proskauer test: Negative

(12) Utilization of sugars: Acid is produced from glucose, fructose, mannose, sucrose, lactose, mannitol and sorbitol.
(13) Assimilatory property of hydrocarbons: Assimilates propane, n-butane, n-dodecane, n-tridecane, n-tetradecane, n-pentadecane, n-hexadecane, and n-heptadecane.

*Brevibacterium butanicum*

(A) Morphological properties—
   Shape of bacterium: Usually short rod, frequently incomplete fission cells and snapping type-fission cells are noted, however, branched cells are not recognized.
   Size: 0.5×3.0—6.0 micron
   Motility: Non-motile
   Spore: Not formed
   Flagella: Not formed
   Gram-staining: Positive
   Acid-fast: Not acid-fast (B) Culturing properties—
   (1) Agar colonies, abundant growth, circular, smooth, entire, unbonate, pale brown, dull and opaque
   (2) Agar slant, abundant growth, echinulate, dull, pale brown, no odor, butyrous, the culture medium is not changed.
   (3) Nutrient broth, the growth of the surface is membraneous, almost clear, no sediment.
   (4) Gelatin stab culture, the growth of the upper part is better than the lower part and no liquefaction is observed.

(C) Physiological properties—
   (1) Optimum temperature: 25°–30° C. (the growth at 37° C. is slight).
   (2) Optimum pH: 6.0–9.0
   (3) Oxygen requirement: Aerobic
   (4) Litmus milk: Not changed or alkaline
   (5) Hydrogen sulfide: Produced
   (6) Indole: Not produced
   (7) Starch: Not decomposed
   (8) Nitrites produced from nitrates
   (9) Catalase: Positive
   (10) Production of ammonium: Negative
   (11) Voges-Proskauer test: Negative
   (12) Utilization of sugars: Acid is produced from glucose, fructose, arabinose, mannose, sucrose, xylose, mannitol and sorbitol
   (13) Hydrocarbon-assimilatory property: Assimilates propane, n-butane, n-decane, n-undecane, n-dodecane, n-tridecane, n-tetradecane, n-pentadecane, n-hexadecane and n-heptadecane.

*Brevibacterium paraffinolyticum*

(A) Morphological properties—
   Shape of bacterium: Rods, frequently snapping-type fission cells are noted but branched cells are not recognized.
   Size: 0.5×2.5—5.0 microns
   Motility: Non-motile
   Spore: Not formed
   Flagella: Not formed
   Gram-staining: Positive
   Acid fast: Not acid-fast (B) Culturing properties—
   (1) Agar colonies, abundant growth, circular, smooth, entire, convex to capitate, pale pink, glistening and opaque
   (2) Agar slant, abundant growth, filiform, glistening, yellowish-gray, no odor, butyrous; the culture medium is not changed.
   (3) Nutrient broth, the growth of the surface is faint and moderately clouding.
   (4) Gelatin stab culture, none or slightly at top. Not liquefied.

(C) Physiological properties—
   (1) Optimum temperature: 25°–30° C. (the growth at 35° C. is extremely slight).
   (2) Optimum pH: 5.0–9.0 (the growth is not recognized at pH 4.0).
   (3) Oxygen requirement: Aerobic
   (4) Litmus milk: Not changed or alkaline
   (5) Hydrogen sulfide: Produced
   (6) Indole: Not produced
   (7) Starch: Not decomposed
   (8) Nitrites produced from nitrates
   (9) Catalase: Positive
   (10) Production of ammonium: Negative
   (11) Voges-Proskauer test: Negative
   (12) Utilization of sugars: Acid is produced from glucose, fructose, sucrose, lactose, mannitol and sorbitol.
   (13) Assimilatory property of hydrocarbons: Assimilates propane, n-butane, n-undecane, n-dodecane, n-tridecane, n-tetradecane, n-pentadecane, n-hexadecane and n-heptadecane.

Based on the above properties, the taxonomical position of *Corynebacterium alkanum* has been examined with reference to "Bergey's Manual of Determinative Bacteriology," 7th edition (1957). This microorganism belongs to the family Corynebacteriaceae because of the rod-form cells, not being acid-fast, the non-formation of trichomes, the gram-positive property, the non-formation of endospores, the formation of branched cells and the fact that sugars are not fermented anaerobically. Furthermore, this strain belongs to the genus Corynebacterium because of the curved and snapping-type fission cells and the positive catalase property which is characteristic of this family. The strain is most close to *Corynebacterium agropyri* and *Corynebacterium rathayi* among the species in the genus Corynebacterium. However, as is shown in Table 1, this strain is different from *Corynebacterium agropyri* in its size, its gram-staining property and its growth in a bouillon-agar slant culture. It is also different from *Corynebacterium rathayi* in its size, growth and gelatin liquefying ability. Moreover, it is different from the above-mentioned two species with respect to its properties of colony and its ability to assimilate gaseous and liquid hydrocarbons. This strain is evidently a new species and, accordingly, has been named *Corynebacterium alkanum*.

The taxonomical position of *Brevibacterium butanicum* has been determined by the same method as described above. It belongs to the family Brevibacteriaceae because of the rod-form cells, not being acid-fast, the non-formation of trichomes, the gram-positive property, the non-formation of endospores and the fact that unbranched cells are formed. Furthermore, it belongs to the genus Brevibacterium because of unbranched rods which do not form filaments. This strain is considered to be most close to *Brevibacterium maris*, *Brevibacterium fuscum* and *Brevibacterium ammoniagenes* in this genus. However, as shown in Table 2, this strain is (a) different from *Brevibacterium maris* in its size, color tone and elevation of the agar colonies, production of hydrogen sulfide and action to sucrose, (b) different from *Brevibacterium fuscum* in its size, color tone and elevation of the agar colonies, and growth in a gelatin stab culture and a bouillon culture, and (c) different from *Brevibacterium ammoniagenes* in its size and elevation of the agar colonies and color-tone of its colonies. Furthermore, this strain is different from two of these species in its consistency in the agar slant and its ability to assimilate gaseous and liquid hydrocarbons. Therefore, it is considered to be a new species of microorganism and has been designated as *Brevibacterium butanicum*.

The taxonomical position of *Brevibacterium paraffinolyticum* has been determined by the same method as described above. It belongs to the family Brevibacteriaceae because of its rod-form cells, not being acid-fast, the non-formation of trichomes, its gram-positive staining, non-formation of endospores and unbranched cells. It belongs to the genus Brevibacterium because of the unbranched cells which do not form filaments. It is most close to *Brevibacterium maris*, *Brevibacterium fuscum* and *Brevibacterium ammoniagenes* among the strains in this genus. However, as shown in Table 2, it is (a) different from *Brevibacterium maris* in its size, color tone, growth in a bouillon culture, action with respect to sucrose and the production of hydrogen sulfide, (b) different from *Brevibacterium fuscum* in its size and growth in a gelatin stab culture, and (c) different from *Brevibacterium ammoniagenes* in its size and color tone. Furthermore, this strain is different from two of these species with respect to its consistency in the agar slant and its ability to assimilate gaseous and liquid hydrocarbons. Hence, this strain is also considered to be a new species and has been named *Brevibacterium paraffinolyticum*. Moreover, this strain is considered to be different from *Brevibacterium butanicum* in its color tone, luster and its ability to utilize sugars.

such as pentene-2, hexene-1, octene-1, octene-2, etc., cycloolefins such as cyclohexene and the like. It is also possible to use aromatic hydrocarbons such as benzene, the isomeric xylenes, etc., and mixtures thereof and mixed hydrocarbons such as kerosene, light oils, heavy oils, paraffin oils, etc. as the carbon source. Of course, mixtures of two or more of these substances may be employed in the medium.

Small amounts of other carbon sources such as sugars or sugar alcohols, for example, glucose, fructose, maltose, sucrose, starch, starch hydrolysate, molasses, etc., or any other suitable carbon source such as organic acids, for example, acetic acid, lactic acid, etc., and alcohols such as ethanol, n-butanol, etc., may be employed in the medium. These substances may also be used either singly or in mixtures of two or more.

The inorganic and organic nitrogen sources conventionally employed in glutamic acid fermentations may be used as the nitrogen source in the present invention. These include various kinds of inorganic or organic salts or compounds, such as urea, ammonia or ammonia salts such as ammonium chloride, ammonium sulfate, ammonium nitrate, ammonium acetate, ammonium phosphate,

TABLE 1

| | Corynebacterium agropyri | Corynebacterium rathayi | Corynebacterium alkanum |
|---|---|---|---|
| Size, micron | 0.4–0.6×0.6–1.1 | 0.6–0.75×0.75–1.5 | 0.5×2.5–5.0. |
| Color tone in a bouillon-agar slant culture. | Yellow | Yellow | Yellowish gray. |
| Gram-staining | Variable | Positive | Positive. |
| Utilization of sugars: | | | |
| Glucose | Produce acid | Produce acid | Produce acid. |
| Sucrose | | do | Do. |
| Lactose | Produce acid | do | Do. |
| Decomposing ability of starch | Weak | | None. |
| Gelatin stab culture | Not liquefied | Gradually liquefied after 7 weeks | Not liquefied. |
| Color tone and growth in a bouillon-agar plate culture. | Yellow, weak, very viscous growth | Yellow slow growth | Yellowish-gray, medium growth butyrous. |

TABLE 2

| | Brevibacterium maris | Brevibacterium fuscum | Brevibacterium ammoniagenes | Brevibacterium paraffinolyticum | Brevibacterium butanicum |
|---|---|---|---|---|---|
| Size, micron | 0.7–0.8×1.0–1.2 | 0.6×1.5 | 0.8×1.4–1.7 | 0.5×2.5–5.0 | 0.5×2.5–5.0. |
| Bouillon-agar plate culture | Orange yellow convex | Brownish-yellow, slight convex. | Gray or pale-yellow flat. | Pale pink convex to to capitate. | Pale brown umbonate. |
| Gelatin stab culture | Not liqefied | Gradually liquefied | Not liquefied | Not liquefied | Not liquefied. |
| Nutrient broth | Clear with orange pellicle and sediment. | Turbidity with pellicle and sediment. | Moderate turbidity near the surface. | Surface growth faint, moderately clouding. | |
| Utilization of sugars: | | | | | |
| Sucrose | None | | | Produce acid | Produce acid. |
| Lactose | do | | | do | Do. |
| Hydrogen sulfide | Not produced | | | Produced | Produced. |

The novel strains described in the present application have been deposited with the American Type Culture Collection and have been given the following designations:

*Corynebacterium alkanum* ATCC 21194
*Brevibacterium paraffinolyticum* ATCC 21195
*Brevibacterium butanicum* ATCC 21196

Either a synthetic culture medium or a natural nutrient medium is suitable in the present invention as long as it contains the essential nutrients for the growth of the particular strain employed and, because of the hydrocarbon-assimilatory property of the strains used herein, contains a hydrocarbon as the main carbon source. Such nutrients are well known in the art and include substances such as a carbon source, a nitrogen source, inorganic compounds and the like which are utilized by the microorganism employed in appropriate amounts.

Gaseous hydrocarbons as well as liquid hydrocarbons may be utilized as the carbon source in the process of the present invention. Gaseous hydrocarbons having from 2 to 4 carbon atoms are employed, such as ethane, n-propane, isopropane, n-butane, sec-butane, iso-butane and tert-butane. Liquid aliphatic hydrocarbons having from 5 to 18 carbon atoms are utilizable, for example, n-pentane, n-octane, n-decane, n-dodecane, n-hexadecane, isopentane, isooctane, etc., cycloparaffins such as cyclohexane and cyclooctane, straight- and branched-chain olefins etc., or natural substances containing nitrogen, such as cornsteep liquor, yeast extract, meat extract, peptone, fish meal, bouillon, casein hydrolysates, casamino acid, fish solubles, rice bran extract, etc. Again, these substances may be used either singly or in combinations of two or more.

Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, zinc sulfate, etc.

The fermentation or culturing of the microorganisms is conducted under aerobic conditions, such as aerobic shaking of the culture or with stirring and aeration of a submerged culture, at a temperature of, for example, about 20° to 50° C. and at a pH of, for example, about 4.0 to 9.0. After about 3 to 7 days of culturing under these conditions, large amounts of L-glutamic acid are found to be accumulated in the resultant culture liquor.

If gaseous hydrocarbons are employed, they are supplied as gases mixed with air or oxygen and an aeration type method is employed. The concentration of gases used need not be restricted to any particular value.

The various techniques employed in conventional fermentations using saccharine materials or liquid hydrocarbons can be used in the present invention. For example, the velocity of fermentation is extremely accelerated by adding small amounts of non-utilizable hydrocarbons such as pristane to the medium, other substances having similar effects or surface active agents in order to elevate the dissolved rate of gaseous hydrocarbons in the culture medium.

The fermentation is complete when the production of L-glutamic acid shows a maximum value. After the completion of culturing, the L-glutamic acid can be recovered by conventional means, such as ion exchange resin treatment, extraction with solvents, precipitation, adsorption, chromatography or the like. A preferred procedure is to pass the cultured liquor through an ion exchange resin in order to adsorb the L-glutamic acid. It is then eluted, concentrated and cooled. The resultant crystals are recovered and further recrystallized as desired in order to obtain pure crystals.

The following examples are given merely as illustrative of the present invention and are not to be considered as limiting. Unless otherwise noted, the percentages therein and throughout the application are by weight per liter of water.

EXAMPLE 1

Corynebacterium alkanum ATCC 21194 is used as the seed microorganism. It is cultured with aerobic shaking for 24 hours in a seed medium containing 0.25% yeast extract, 0.5% meat extract, 0.5% peptone, 0.25% sodium chloride and 2.0% sorbitol at a pH of 7.2 in order to obtain a seed culture. The resultant seed culture is inoculated in a ratio of 10% by volume into 2.7 liters of a previously sterilized fermentation medium contained in a 5-liter jar fermentor and having the following composition:

0.05% $KH_2PO_4$
0.05% $Na_2HPO_4 \cdot 12H_2O$
0.01% $MgSO_4 \cdot 7H_2O$
0.001% $MnSO_4 \cdot 4H_2O$
0.001% $FeSO_4 \cdot 7H_2O$
0.001% $ZnSO_4 \cdot 7H_2O$
0.001% $CaCl_2 \cdot 2H_2O$
10 $\gamma$/l $H_3BO_3$
10 $\gamma$/l $Na_2MoO_4 \cdot 2H_2O$
50 $\gamma$/l $CuSO_4 \cdot 5H_2O$
10 $\gamma$/l $CoCl_2 \cdot 2H_2O$
50 $\gamma$/l $NiCl_2 \cdot 6H_2O$
0.05% cornsteep liquor
1.5% $(NH_4)_2SO_4$ The pH of the medium is 7.2.

Culturing is carried out at 30° C. for 96 hours with agitation at the rate of 600 r.p.m. and aeration with a gaseous mixture of n-butane and air (50:50 v./v.) at the rate of one liter per liter per minute. The pH of the medium is maintained at 7.2 during cultivation by adding aqueous ammonia to the medium. At the completion of fermentation, the amount of L-glutamic acid produced and accumulated in the culture liquor is 18 mg./ml.

The microorganism cells are separated from the fermentation liquor by means of a centrifuge after the completion of fermentation. Thereafter, the pH thereof is adjusted to 2.0. The liquor is passed through the cation exchange resin Amberlite IR–120 (H-type), and the resin is eluted with aqueous ammonia. The obtained effluent is concentrated and cooled. As a result, 41 grams of crystals of L-glutamic acid is obtained.

EXAMPLE 2

Culturing is conducted in the same manner as described in Example 1 with the use of Brevibacterium butanicum ATCC 21196, except that a mixed gas having the mixture ratio of propane and air of 50:50 (v./v.) is used as the main carbon source. After 96 hours of culturing the amount of L-glutamic acid accumulated in the resultant culture liquor is 15 mg./ml.

About 33 grams of L-glutamic acid is obtained as a result of a recovery procedure conducted in the same manner as described in Example 1.

EXAMPLE 3

Brevibacterium paraffinolyticum ATCC 21195 is used as the seed strain. It is cultured with aerobic shaking for 24 hours at a pH of 7.2 in a seed medium containing 0.25% yeast extract, 0.5% meat extract, 0.5% peptone, 0.25% sodium chloride and 2.0% sorbitol in order to obtain a seed culture. The resultant seed culture is inoculated in a ratio of 10% by volume into 2.7 liters of a previously sterilized fermentation medium contained in a 5-liter jar fermentor and having the following composition:

0.05% $KH_2PO_4$
0.05% $Na_2HPO_4 \cdot 12H_2O$
0.01% $MgSO_4 \cdot 7H_2O$
0.001% $MnSO_4 \cdot 4H_2O$
0.001% $FeSO_4 \cdot 7H_2O$
0.001% $ZnSO_4 \cdot 7H_2O$
0.001% $CaCl_2 \cdot 2H_2O$
10 $\gamma$/l $H_3BO_3$
10 $\gamma$l $Na_2MoO_4 \cdot 2H_2O$
50 $\gamma$/l $CuSO_4 \cdot 5H_2O$
10 $\gamma$/l $CoCl_2 \cdot 2H_2O$
50 $\gamma$/l $NiCl_2 \cdot 6H_2O$
0.3% cornsteep liquor
1.5% $(NH_4)_2SO_4$ The pH of the medium is 7.2.

Culturing is conducted in the same manner and under the same conditions as described in Example 1. After 30 hours of culturing, 50 units/ml. of penicillin G potassium salt is further added to the medium and culturing is continued. After 96 hours of culturing, 10 mg./ml. of L-glutamic acid is produced in the culture liquor.

When culturing is conducted in the same manner but without the addition of penicillin, the amount of L-glutamic acid produced is 0.3 mg./ml.

EXAMPLE 4

2.7 liters of a culture medium containing the following components is prepared in a 5-liter jar fermentor and sterilized:

0.05% $KH_2PO_4$
0.05% $Na_2HPO_4 \cdot 12H_2O$
0.01% $MgSO_4 \cdot 7H_2O$
0.001% $MnSO_4 \cdot 4H_2O$
0.001% $FeSO_4 \cdot 7H_2O$
0.001% $ZnSO_4 \cdot 7H_2O$
0.001% $CaCl_2 \cdot 2H_2O$
10 $\gamma$/l $H_3BO_3$
10 $\gamma$/l $Na_2MoO_4 \cdot 2H_2O$
50 $\gamma$/l $CuSO_4 \cdot 5H_2O$
10 $\gamma$l $CoCl_2 \cdot 2H_2O$
50 $\gamma$/l $NiCl_2 \cdot 6H_2O$
0.05% cornsteep liquor
1.5% $(NH_4)_2SO_4$
1% n-dodecane
0.05% Nonion LP–20

The pH of the medium is 7.2.

A seed culture of Corynebacterium alkanum ATCC 21194 is prepared in the same manner as described in Example 1. The seed culture is inoculated into the above-described culture medium in the ratio of 10% by volume.

Culturing is conducted in the same manner as described in Example 1 for 96 hours. At the completion of culturing, 21 mg./ml. of L-glutamic acid is found to be accumulated in the culture liquor.

It is to be noted from the above description that the addition of antibiotics or surface active agents to the medium accelerates the fermentation and increases the yield of L-glutamic acid. Exemplary antibiotics and surfactants (dispersing agents) to be used in this regard include substances such as those disclosed in copending application Ser. No. 643,832, filed on June 6, 1967. Suitable antibiotics include penicillin, bacitracin, cycloserine, kanamycin, streptomycin, spiramycin, Cefalotin, Cephaloridine and novobiocin. Suitable surface active agents include anionic, cationic and nonionic substances and higher fatty acids and organic esters. Mixtures of antibiotics and dispersing agents may also be used.

The invention being thus described, it will be obvious that the same may be varied in many ways. Such variations are not to be regarded as a departure from the spirit and scope of the invention and all such modifications as would be obvious to one skilled in the art are intended to be included herein.

We claim:

1. A process for producing L-glutamic acid which comprises culturing a microorganism selected from the group consisting of *Corynebacterium alkanum* ATCC 21194, *Brevibacterium paraffinolyticum* ATCC 21195 and *Brevibacterium butanicum* ATCC 21196 under aerobic conditions and in an aqueous nutrient medium containing a gaseous hydrocarbon having from 2 to 4 carbon atoms or a mixture of gaseous hydrocarbons having from 2 to 4 carbon atoms as the main source of carbon, and accumulating and isolating L-glutamic acid in the resulting culture liquor.

2. The process of claim 1, wherein culturing is carried out at a temperature of about 20° to 50° C. and at a pH of about 4.0 to 9.0.

3. The process of claim 1, wherein said gaseous hydrocarbon is supplied to the medium as a gaseous mixture with oxygen or air.

4. The process of claim 1, wherein a surface active agent is added to the medium.

5. The process of claim 1, wherein an antibiotic is added to the medium.

6. The process of claim 5, wherein said antibiotic is penicillin.

References Cited

UNITED STATES PATENTS

| | | | |
|---|---|---|---|
| 3,406,095 | 10/1968 | Otsuka et al. | 195—28 |
| 3,511,752 | 5/1970 | Tanaka et al. | 195—28 |
| 3,219,543 | 11/1965 | Douros et al. | 195—3 |
| 3,222,258 | 12/1965 | Iizuka et al. | 195—3 |
| 3,355,296 | 11/1967 | Perkins et al. | 99—14 |

A. LOUIS MONACELL, Primary Examiner

G. M. NATH, Assistant Examiner